United States Patent [19]

Tsuchiya et al.

[11] Patent Number: 5,896,130
[45] Date of Patent: Apr. 20, 1999

[54] SIGNAL PROCESSING DEVICE AND METHOD FOR ADJUSTING THE PICTURE SIGNAL BASE ON THE SELECTED INPUT

[75] Inventors: Kazuhiro Tsuchiya; Yuichi Takahashi, both of Kanagawa; Noriyuki Hitachiya, Tokyo, all of Japan

[73] Assignee: Sony Corporation, Tokyo, Japan

[21] Appl. No.: 08/785,967

[22] Filed: Jan. 22, 1997

[30] Foreign Application Priority Data

Jan. 31, 1996 [JP] Japan ................................. 8-014976

[51] Int. Cl.$^6$ ............................ H04N 5/268; H04N 5/46
[52] U.S. Cl. ........................ 345/327; 348/460; 348/552; 348/559; 348/556
[58] Field of Search ................................. 345/327, 328, 345/302, 112, 117, 150; 340/460, 552, 554, 556, 557, 558, 571, 705, 722, 725, 729, 731, 739, 738; 455/6.3; 463/1, 30–34, 40–45

[56] References Cited

U.S. PATENT DOCUMENTS

| 5,253,044 | 10/1993 | Lamy | 348/554 X |
| 5,438,375 | 8/1995 | Sasabe et al. | 348/554 X |
| 5,500,690 | 3/1996 | Vilard | 348/554 X |
| 5,610,663 | 3/1997 | Nan et al. | 348/554 |
| 5,614,956 | 3/1997 | Matsuura | 348/556 |

*Primary Examiner*—Nathan Flynn
*Attorney, Agent, or Firm*—Jay H. Maioli

[57] ABSTRACT

A signal processing device which makes an adjustment of a displayed picture easy. When a game button 31 of a television is pressed, a picture and a sound from a game unit are selected from among a plurality of inputs, an indicator 10 lights up and a predetermined sound is outputted to confirm for the user that the picture and the sound of the game unit have been selected. When the game button 31 is rotated, preset types of adjustment of the displayed picture, for example, a change to the aspect ratio or a change to the position in which the picture is displayed on a CRT, are carried out.

9 Claims, 15 Drawing Sheets

FIG.6

| rotation direction | output | pulse output waveform |
|---|---|---|
| clockwise (CW) | A | |
| | B | |
| | C | |
| counter clockwise (CCW) | A | |
| | B | |
| | C | |
| interrupt signal | | |

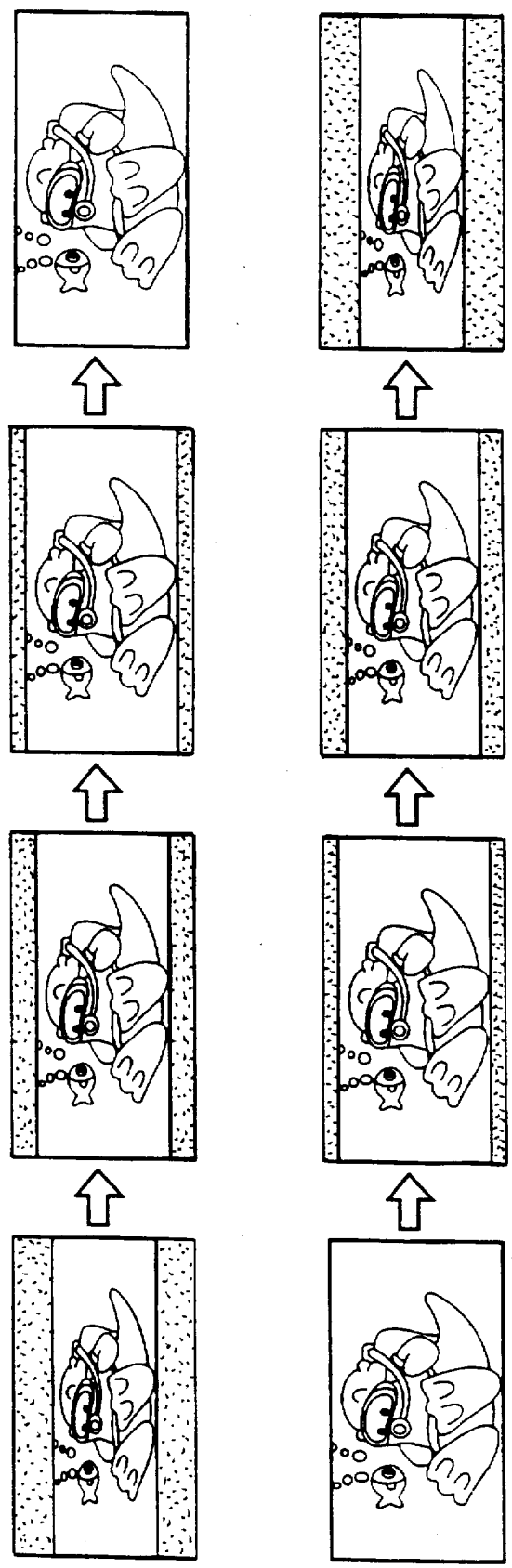

FIG. 9A
FIG. 9B

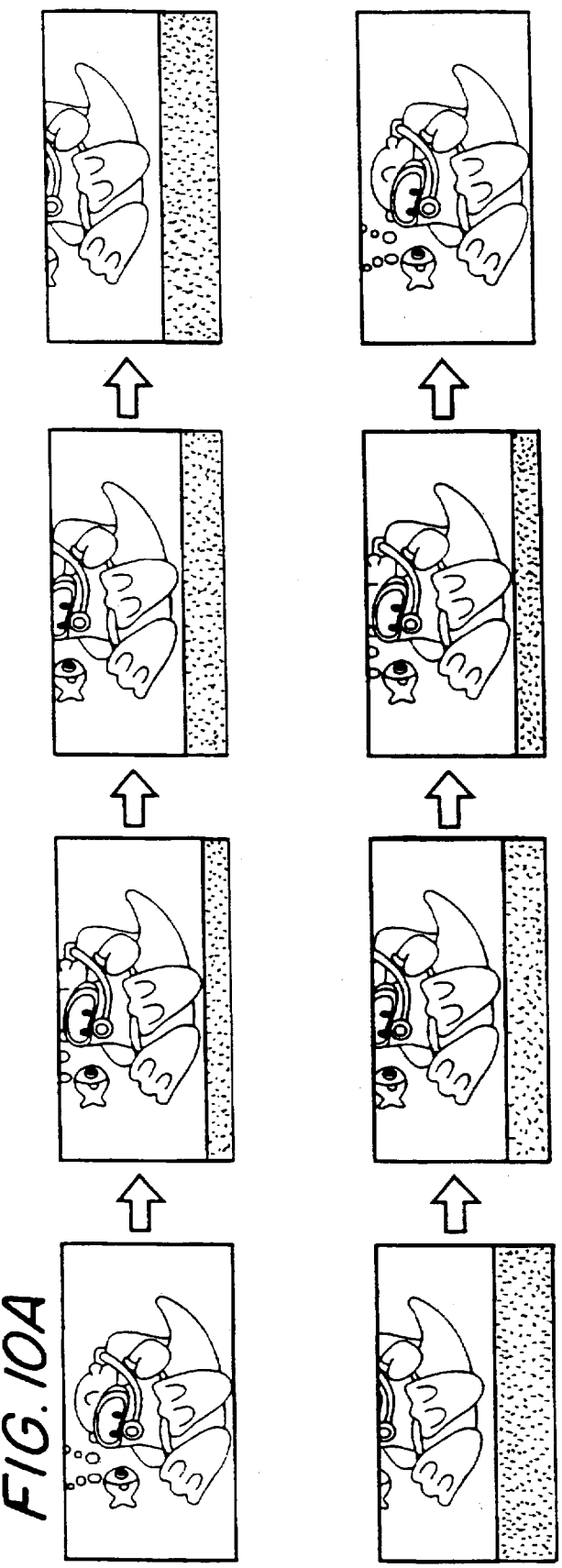

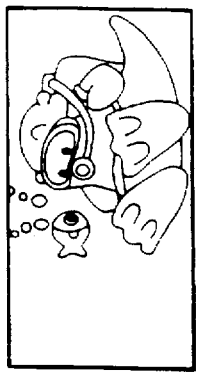
FIG. 11A
FIG. 11B

SIGNAL PROCESSING DEVICE AND METHOD FOR ADJUSTING THE PICTURE SIGNAL BASE ON THE SELECTED INPUT

FIELD OF THE INVENTION

This invention relates to a signal processing device and method, and particularly to a signal processing device and method wherein a predetermined sound is outputted in response to a selection operation of an input operation part and the direction of a rotation of the input operation part is detected and a predetermined type of adjustment is carried out on an outputted picture signal in correspondence with the direction of rotation.

BACKGROUND OF THE INVENTION

Various games have been enjoyed in homes and elsewhere by a game unit being connected to a television receiver (TV).

When connecting this kind of game unit to a TV for use, the user connects a picture output cable and a sound output cable of the game unit to external input terminals of the TV and connects an AC/DC adaptor for use with the game unit to the game unit as a d.c. power supply.

The user then adjusts the screen mode, the picture quality, the sound quality and the sound field of the picture and the sound of the TV according to the picture and the sound of the game unit before enjoying a game.

However, the operation of connecting the picture signal cable and the sound signal cable between the TV and the game unit and also connecting the game unit to a main power supply with the AC/DC adaptor is very complicated and tiresome.

Furthermore, with an ordinary TV, because the picture and the sound of the game unit are displayed and outputted by a picture signal cable and a sound signal cable of the game unit being connected to general purpose picture and sound input terminals of the TV and these input terminals being selected by an operation of the TV, there has been the problem that the selection operation of selecting, displaying and outputting the picture and the sound of the game unit is difficult to understand.

There has also been the problem that the operation of adjusting the screen settings of the TV to suit the picture of the game unit has been very complicated.

As a result, the present inventors have previously proposed for example in Japanese Unexamined Patent Publication No. H.6-156888 the idea of newly providing a TV with an input terminal for a game unit and a terminal providing a d.c. power supply to a game unit and thereby making the above-mentioned connection operation simple and also providing an input part with which it is possible to select the picture and the sound of the game unit with a single operation and thereby making the above-mentioned selection operation simple, and also arranging for screen settings of the TV to be changed to preset values suited to the picture of the game unit when this input part is operated.

According to this proposals the game unit is connected by predetermined cables to game unit input terminals of the TV (and is also simultaneously provided with a d.c. power supply), and by one operation of the input part being carried out the picture and the sound of the game unit are selected and also the picture and the sound of the game unit are adjusted according to values of predetermined adjusting parameters.

However, there has been the problem that when playing a plurality of games requiring different settings it is necessary to carry out a complicated setting changing operation to adjust the screen of the TV, and also when the aspect ratio of the screen and the aspect ratio of the picture of the game are different it is necessary to carry out a complicated setting changing operation to adjust the screen of the TV to optimize the state of the display.

Also, according to the above-mentioned proposal, when the input part is operated to select a picture and sound input an indicator lights up, but there has been the problem that in a bright place a lighted indicator is difficult to see.

SUMMARY OF THE INVENTION

The present invention was made in view of the kinds of problem described above, and an object of the invention is to provide a signal processing device and a signal processing method wherein simple screen setting is made possible by a function of carrying out an adjustment of picture settings that is added to an input operation part operated to select a predetermined picture and sound input and when the input operation part is operated and a predetermined input is thereby selected a predetermined sound is outputted and the user is thereby informed that this input has been selected.

To achieve the above-mentioned object and other objects, a first aspect of the invention provides a signal processing device having inputting means operated to select a predetermined picture signal from among a plurality of picture signals and rotated to carry out adjustment of the predetermined picture signal, detecting means for detecting rotation of the inputting means, and adjusting means for carrying out adjustment of the predetermined picture signal in correspondence with the rotation detected by the detecting means.

A second aspect of the invention provides a signal processing method comprising the steps of detecting a selection operation of an input operation part, selecting a predetermined picture signal from among a plurality of picture signals in correspondence with the selection operation, detecting a rotation of the input operation part, and carrying out a predetermined type of adjustment on the predetermined picture signal in correspondence with the rotation.

A third aspect of the invention provides a signal processing device comprising inputting means operated to select a predetermined picture signal from among a plurality of picture signals and sound outputting means for outputting a predetermined sound in response to an operation of said inputting means.

An fourth aspect of the invention provides a signal processing method comprising the step of outputting a predetermined sound in response to an operation of an input operation part when a predetermined picture signal is selected from among a plurality of picture signals.

In a signal processing device according to the first aspect of the invention, the inputting means is operated to select a predetermined picture signal from among a plurality of picture signals and is rotated to carry out adjustment of the picture signal and the detecting means detects rotation of the inputting means and the adjusting means carries out an adjustment of the picture signal in correspondence with the rotation detected by the detecting means.

For example, when the inputting means is rotated clockwise, the detecting means detects that the rotation direction is clockwise and the adjusting means carries out adjustment of the picture signal in correspondence with the clockwise rotation of the inputting means.

In a signal processing method according to the second aspect of the invention, a selection operation of an input operation part is detected, a predetermined picture signal is selected from among a plurality of picture signals in correspondence with the selection operation, a rotation of the input operation part is detected and a predetermined type of adjustment is carried out on the picture signal in correspondence with the rotation.

For example, when the input operation part is rotated clockwise, it is detected that the rotation is clockwise and an adjustment of the picture signal corresponding to the clockwise rotation of the input operation part is carried out.

In a signal processing device according to the third aspect of the invention, the inputting means is operated to select the predetermined picture signal from among a plurality of picture signals and the sound outputting means outputs a predetermined sound in response to the operation of the inputting means.

For example, when the inputting means is operated to select a picture signal of a game unit from among a plurality of input picture signals, a corresponding sound is outputted.

In a signal processing device according to the fourth aspect of the invention, when the picture signal is selected from among the plurality of picture signals, a predetermined sound is outputted in response to an operation of the input operation part.

For example, when the input operation part is operated to select a picture signal of a game unit from among a plurality of input picture signals, a corresponding sound is outputted.

BRIEF DESCRIPTION OF THE DRAWINGS

FIG. 6 is a timing chart of outputs A, B and C of the game button 31 of FIG. 5 and an interrupt signal;

FIG. 8A and FIG. 8B are views illustrating an example of screen adjustment carried out by operating a game button;

FIG. 9A and FIG. 9B are views illustrating another example of screen adjustment carried out by operating a game button;

FIG. 10A and FIG. 10B are views illustrating another example of screen adjustment carried out by operating a game button;

FIG. 11A and FIG. 11B are views illustrating another example of screen adjustment carried out by operating a game button;

DETAILED DESCRIPTION OF THE PREFERRED EMBODIMENTS

Figure 1:
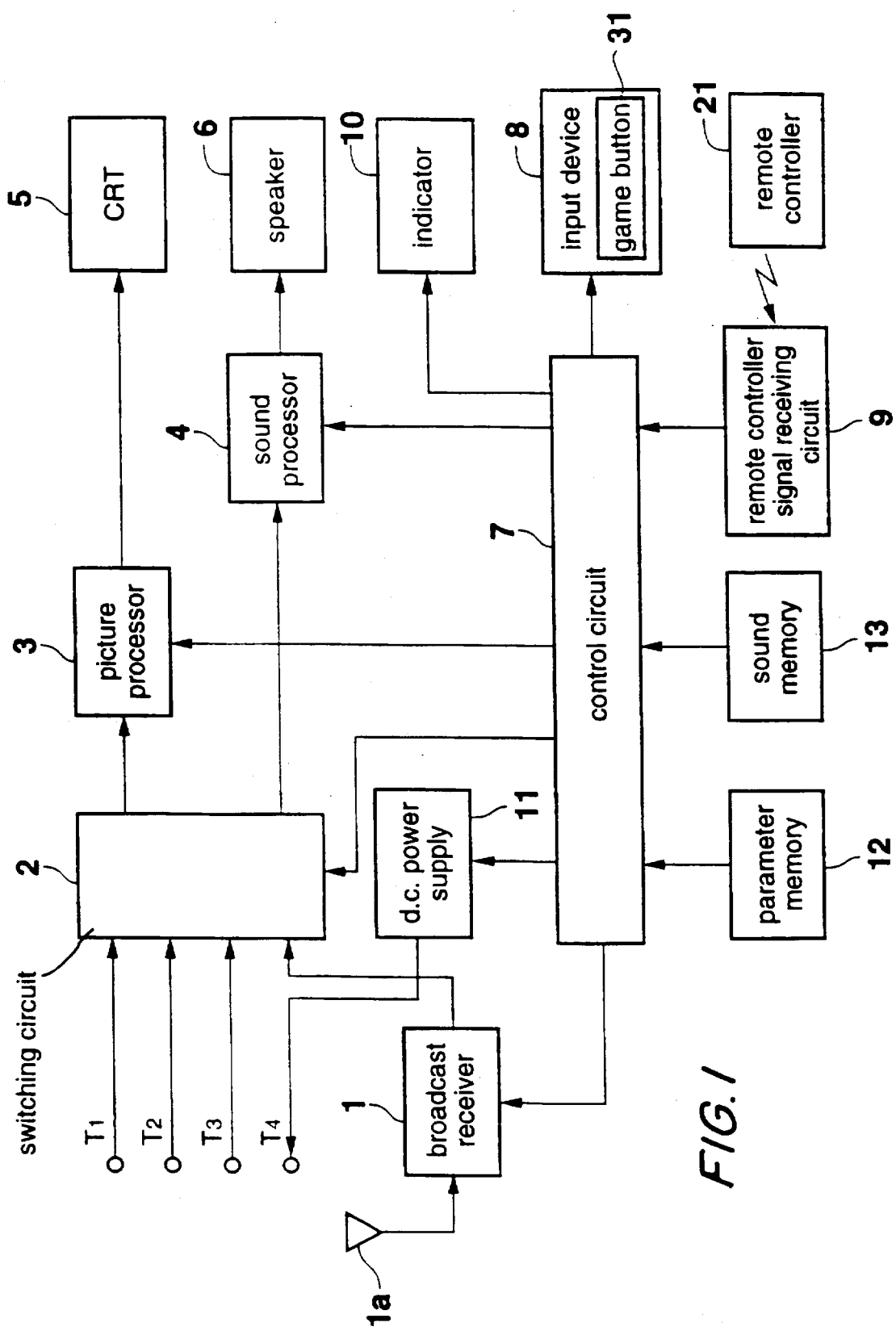
FIG. 1 is a block diagram showing the construction of a preferred embodiment of a TV to which a signal processing device of the invention has been applied.

FIG. 1 shows the construction of a preferred embodiment of a TV to which a signal processing device of the invention has been applied. In this preferred embodiment, a broadcast receiver 1 receives predetermined television broadcast waves through an antenna 1a and demodulates a picture signal and a sound signal of the received broadcast and supplies these to a switching circuit 2.

The switching circuit 2 is supplied with picture signals and sound signals from predetermined video appliances through a 'Video 1' input terminal $T_1$ and a 'Video 2' input terminal $T_2$ and is supplied with a picture signal and a sound signal from a game unit through a game unit input terminal $T_3$, and also is supplied with a picture signal and a sound signal of a television broadcast from the broadcast receiver 1.

According to a predetermined control signal, the switching circuit 2 selects a combination of a picture signal and a sound signal from among these picture signals and sound signals and outputs the picture signal to a picture processor 3 (adjusting means) and outputs the sound signal to a sound processor 4 (sound outputting means).

The picture processor 3 has a Y/C jungle circuit (not shown) and converts the picture signal (a brightness signal (Y signal) and a color difference signal (C signal)) into an RGB signal and outputs this to a CRT 5, and according to a control signal from a control circuit 7 picture processor 3 carries out the control of the electron beam in the CRT 5 and performs adjustment of the picture displayed on the CRT 5.

The sound processor 4 processes the sound signal supplied from the switching circuit 2 according to a control signal from the control circuit 7 and outputs it to a speaker 6. The sound processor 4 also outputs a sound corresponding to an operation of an input device 8 to the speaker 6 according to a predetermined control signal.

The control circuit 7 (detecting means) is supplied with a signal corresponding to operations performed by a user from the input device 8 or from a remote controller 21 by way of a remote controller signal receiving circuit 9, and outputs control signals corresponding to this signal to the broadcast receiver 1, the switching circuit 2, the picture processor 3, the sound processor 4 and a d.c. power supply 11.

For example, if a game button 31 (inputting means) of the input device 8 is pressed, a corresponding signal is fed to the control circuit 7 and the control circuit 7 lights up an indicator 10, reads out predetermined sound data from a sound memory 13 and outputs this sound to the sound processor 4 and also operates the d.c. power supply 11, which supplies power to a game unit via the terminal $T_4$. By a sound being outputted in this way, mistaken operation can easily be noticed and the wasting of power in the d.c. power supply 11 can be reduced.

Also, the control circuit 7 controls the switching circuit 2 and makes it output the picture signal and the sound signal inputted through the game unit input terminal $T_3$ to the picture processor 3 and the sound processor 4 respectively, and reads out from a parameter memory 12 set values corresponding to the picture and the sound of the game unit and outputs these set values to the picture processor 3 and the sound processor 4.

The input device 8 has, besides the game button 31 operated to select the picture and the sound of a game unit, a 'Video 1' selecting button for selecting the 'Video 1' input, a 'Video 2' selecting button for selecting the 'Video 2' input and a television broadcast selecting button for selecting a picture and a sound of a television broadcast (none of which buttons are shown), and when any of these buttons is operated the input device outputs a signal corresponding to that operation to the control circuit 7.

The sound memory 13 stores data of a sound outputted when the game button 31 is pressed.

Figure 2:
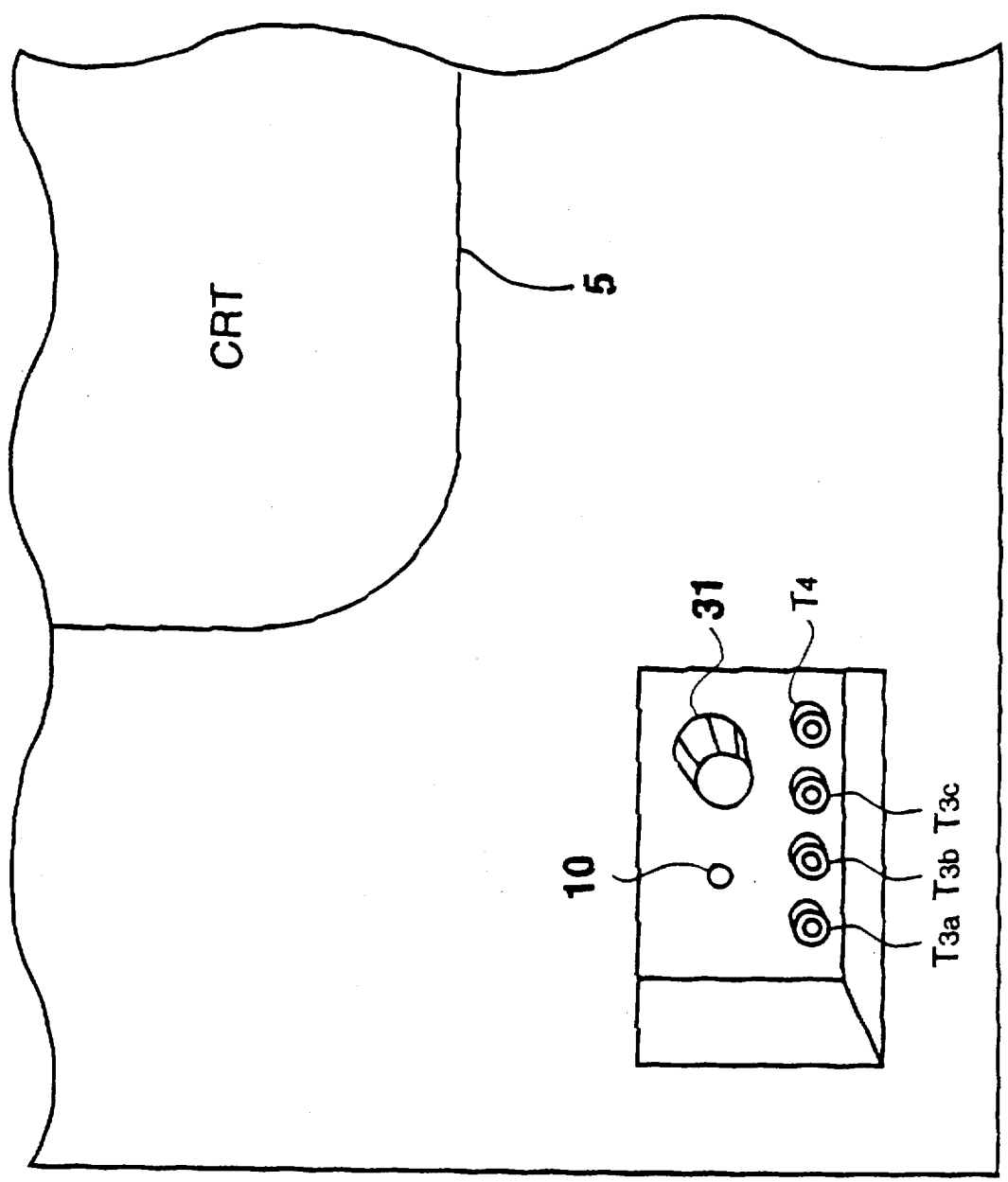
FIG. 2 is a view of an example of an arrangement of a game button 31, an indicator 10 and terminals $T_{3a}$, $T_{3b}$, $T_{3c}$, $T_4$ of FIG. 1.

In this preferred embodiment, as shown in FIG. 2, the game button 31, a picture signal input terminal $T_{3a}$ and left and right side sound signal input terminals $T_{3b}$, $T_{3c}$ serving as the game unit input terminal $T_3$, and a game unit power supply terminal $T_4$ are provided together with the indicator 10 on the front of the TV so that a user can operate them easily.

Figure 3:
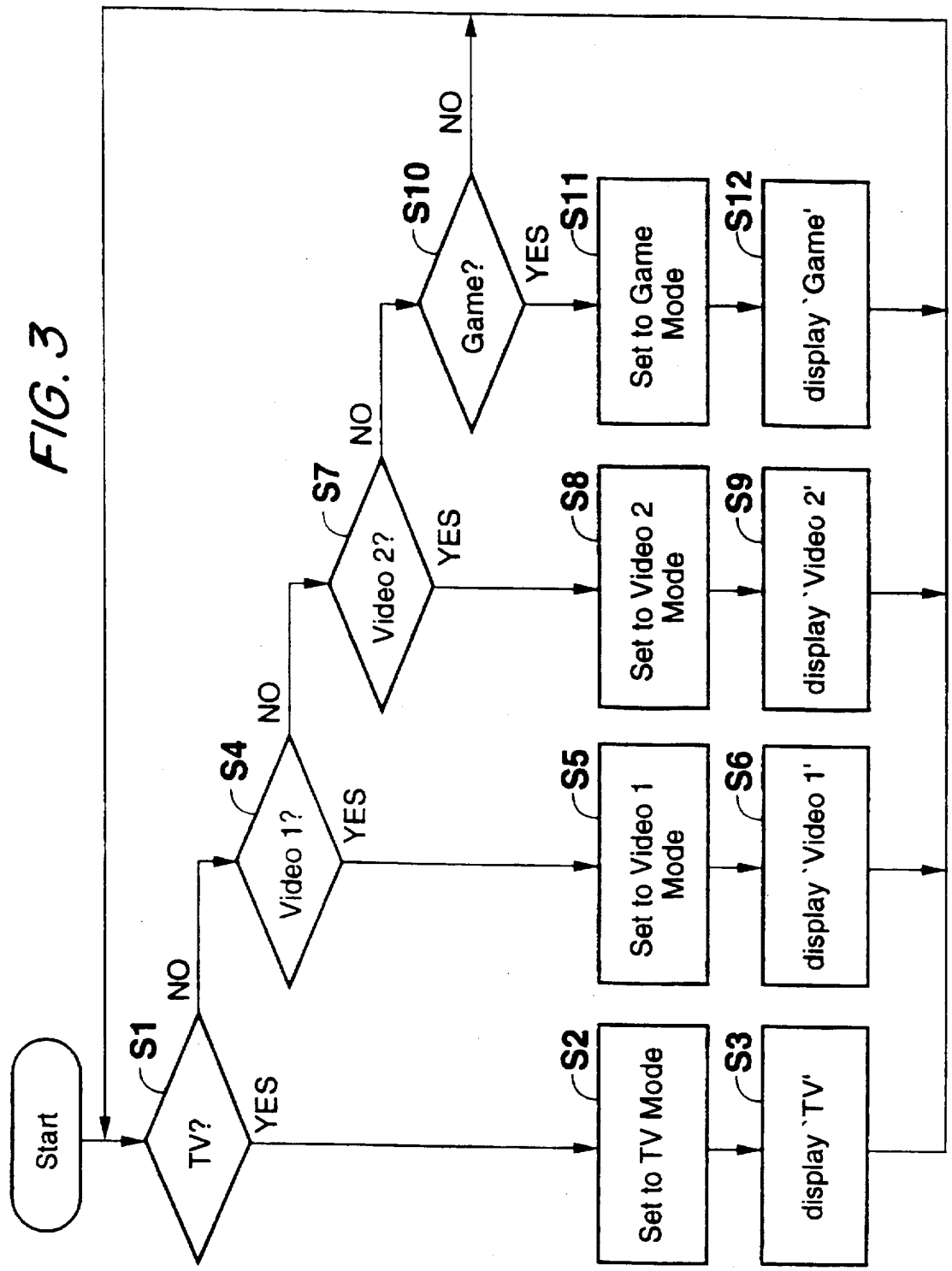
FIG. 3 is a flow chart illustrating the operation of the preferred embodiment of FIG. 1.

Next, with reference to the flow chart of FIG. 3, the operation of the TV shown in FIG. 1 will be explained.

When the power supply of the TV is switched on, the control circuit 7 in a step S1 determines whether or not the television broadcast selecting button has been pressed and when it determines that the television broadcast selecting button has been pressed in a step S2 the control circuit sets to a television mode and makes the switching circuit 2 select and output a picture signal and a sound signal of a television broadcast received by the broadcast receiver 1.

The picture processor 3 then displays the television broadcast picture signal supplied from the switching circuit 2 on the CRT 5 and the sound processor 4 outputs the television broadcast sound signal to the speaker 6.

In a step S3, the control circuit 7 controls the picture processor 3 to make it display the letters 'TV' in a predetermined position on the CRT 5 to confirm for the user that what was just selected was the TV.

When in the step S1 the control circuit 7 determines that the television broadcast selecting button has not been pressed it proceeds to a step S4 and determines whether or not the 'Video 1' selecting button has been pressed.

When the control circuit 7 determines that the 'Video 1' selecting button has been pressed, in a step S5 it sets to a 'Video 1' mode and makes the switching circuit 2 output a picture signal and a sound signal inputted through the 'Video 1' input terminal $T_1$.

The picture processor 3 displays the picture signal of the 'Video 1' input supplied from the switching circuit 2 on the CRT 5 and the sound processor 4 outputs the sound signal of the 'Video 1' input to the speaker 6.

In a step S6, the control circuit 7 controls the picture processor 3 to make it display the letters 'Video 1' in a predetermined position on the CRT 5 to confirm for the user that 'Video 1' has been selected as the input.

When on the other hand in the step S4 the control circuit 7 determines that the 'Video 1' selecting button has not been pressed it proceeds to a step S7 and determines whether or not the 'Video 2' selecting button has been pressed.

When the control circuit 7 determines that the 'Video 2' selecting button has been pressed, in a step S8 it sets to a 'Video 2' mode and makes the switching circuit 2 output a picture signal and a sound signal inputted through the 'Video 2' input terminal $T_2$.

The picture processor 3 displays the picture signal of the 'Video 2' input supplied from the switching circuit 2 on the CRT 5 and the sound processor 4 outputs the sound signal of the 'Video 2' input to the speaker 6.

In a step S9, the control circuit 7 controls the picture processor 3 to make it display the letters 'Video 2' in a predetermined position on the CRT 5 to confirm for the user that 'Video 2' has been selected as the input.

When in the step S7 the control circuit 7 determines that the 'Video 1' selecting button has not been pressed it proceeds to a step S10 and determines whether or not the game button 31 has been pressed.

When the control circuit 7 determines that the game button 31 has been pressed, in a step S11 it sets to a game mode and makes the switching circuit 2 output a picture signal and a sound signal inputted through the game unit input terminal $T_3$.

The picture processor 3 displays the picture signal of the game unit supplied from the switching circuit 2 on the CRT 5 and the sound processor 4 outputs the sound signal of the game unit to the speaker 6.

In a step S12, the control circuit 7 controls the picture processor 3 to make it display the letters 'Game' in a predetermined position on the CRT 5 to confirm for the user that 'Game' has been selected as the input.

When none of these buttons have been pressed, the control circuit 7 stands by in the step S1, the step S4, the step S7 and the step S10 until one of the buttons is pressed.

When a display is being performed in a certain mode, if a button of another mode is pressed it is detected whether this button has been pressed in the step S1, the step S4, the step S7 or the step S10 and the mode shifts to the mode corresponding to that button.

In this way, when any button among the television broadcast selecting button, the 'Video 1' selecting button, the 'Video 2' selecting button and the game button 31 is pressed, corresponding processing is carried out.

Figure 4:
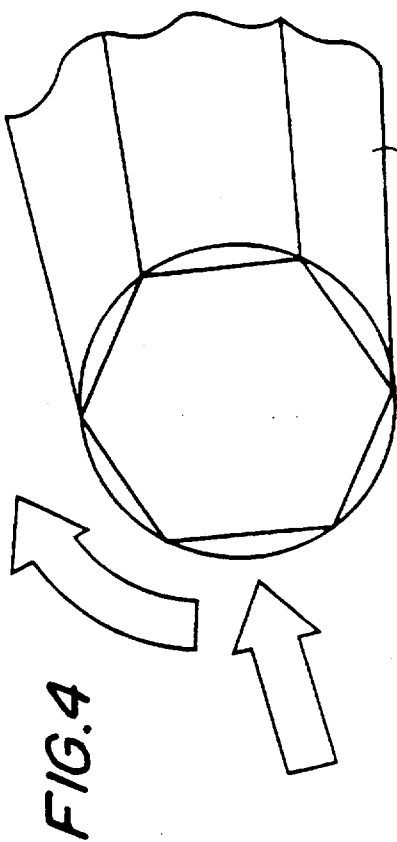
FIG. 4 is a view showing an example of a game button 31.

FIG. 4 shows an example of the game button 31 of FIG. 1. The game button 31, besides being pressed to select the picture signal and the sound signal of the game unit, is rotated to carry out adjustment of the picture displayed by the CRT 5. Straight flutes are provided in the side face of the game button 31 to make it easy to rotate.

Figure 5:
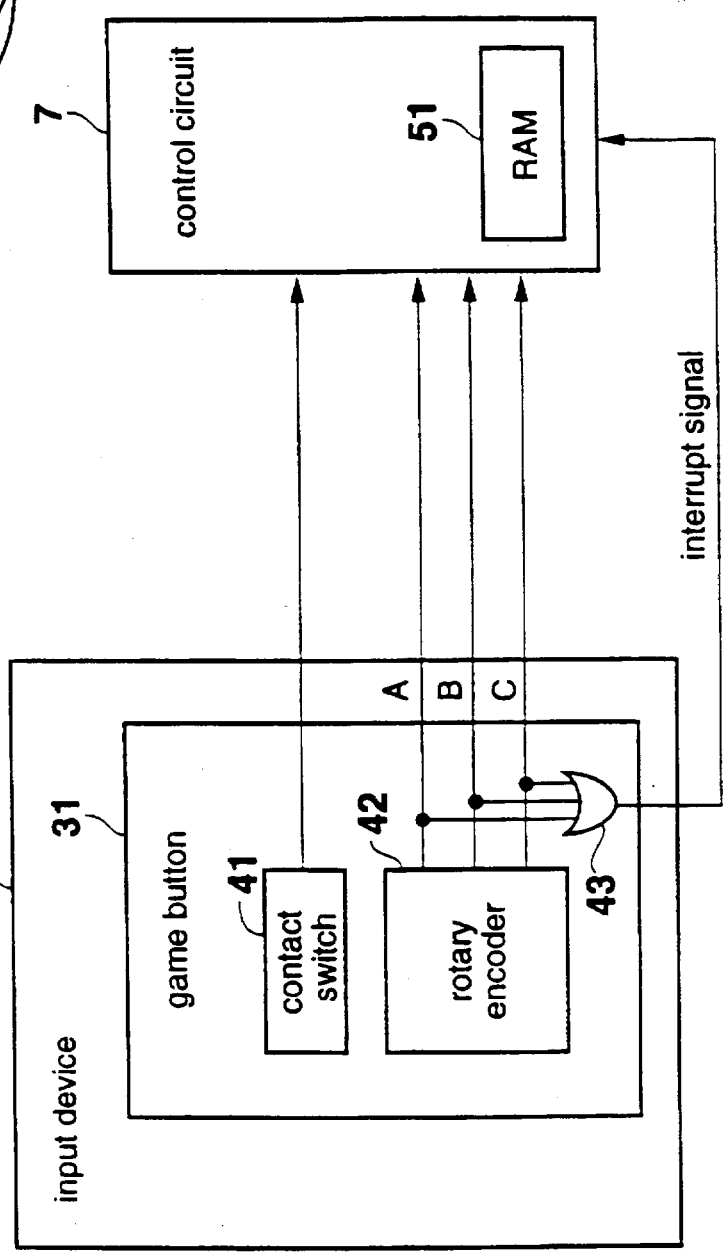
FIG. 5 is a block diagram showing an example of the internal construction of the game button 31.

FIG. 5 shows an example of the internal electrical construction of the game button 31. The game button 31 has a contact switch 41, a rotary encoder 42 and an OR (logical sum) logic element 43.

When the game button 31 is pressed the contact switch 41 senses this operation and outputs a signal corresponding to this operation to the control circuit 7.

When the game button 31 is rotated the rotary encoder 42 senses this rotation and outputs predetermined pulse trains as outputs A, B and C in correspondence with the rotation direction and the amount of rotation of the game button 31, as shown in FIG. 6.

The OR logic element 43 calculates the logical sum of the outputs A, B and C of the rotary encoder 42 and outputs this result as an interrupt signal to an interrupt port of the control circuit 7.

FIG. 6 is a timing chart of the outputs A, B and C of the rotary encoder 42 and the output of the OR logic element 43.

As shown in FIG. 6, when the game button 31 is rotated clockwise (CW), pulses are repeatedly outputted in the order A, C, B, and when the game button 31 is rotated counterclockwise (CCW), pulses are repeatedly outputted in the order A, B, C.

When the interrupt signal is ON, the control circuit 7 stores the output state (the last output among the outputs A, B and C) in a RAM 51 and uses it in detecting the rotation direction of the game button 31 in the next interrupt processing.

Next, the operation of the control circuit 7 when the game button 31 having the rotary encoder 42 is rotated will be described with reference to the flow chart of FIG. 7.

When the game button 31 rotates and the interrupt signal supplied from the OR logic element 43 is ON, the control circuit 7 starts the interrupt processing.

In a step S21, the control circuit 7 determines whether or not the output A of the rotary encoder 42 is ON and if it determines that the output A is ON it proceeds to a step S22 and reads out the state of the output at the time of the previous interrupt processing from the RAM 51 and determines whether or not the output B of the rotary encoder 42 was ON.

When in the step S22 the control circuit 7 determines that the output B at the time of the previous interrupt processing was ON, in a step S23 it determines that the rotary encoder 42 has rotated clockwise.

When in the step S22 the control circuit 7 determines that the output B at the time of the previous interrupt processing was not ON it proceeds to a step S24 and determines whether or not the output C of the rotary encoder 42 at the time of the previous interrupt processing was ON, and when the output C was ON it determines in a step S25 that the rotary encoder 42 has rotated counterclockwise.

When on the other hand in the step S21 the control circuit 7 determines that the output A is not ON it proceeds to a step S26 and determines whether or not the output B is ON, and when it determines that the output B is ON it proceeds to a step S27 and reads out the state of the output at the time of the previous interrupt processing from the RAM 51 and determines whether or not the output C was ON.

When in the step S27 the control circuit 7 determines that the output C was ON at the time of the previous interrupt processing it proceeds to the step S23 and determines that the rotary encoder 42 has rotated clockwise.

When in the step S27 the control circuit 7 determines that the output C at the time of the previous interrupt processing was not ON it proceeds to a step S28 and determines whether or not the output A at the time of the previous interrupt processing was ON, and when the output A was ON it proceeds to the step S25 and determines that the rotary encoder 42 has rotated counterclockwise.

When in the step S26 the control circuit 7 determines that the output B is not ON it proceeds to a step S29 and determines whether or not the output C is ON, and when it determines that the output C is ON it reads out in a step S30 the state of the output at the time of the previous interrupt processing and determines whether or not the output A was ON.

When in the step S30 the control circuit 7 determines that the output A at the time of the previous interrupt processing was ON it proceeds to the step S23 and determines that the rotary encoder 42 has rotated clockwise.

When in the step S30 the control circuit 7 determines that the output A at the time of the previous interrupt processing was not ON it proceeds to a step S31 and determines whether or not the output B was ON, and when the output B was ON it proceeds to the step S25 and determines that the rotary encoder 42 has rotated counterclockwise.

In this way, the rotation direction of the rotary encoder 42 is identified from the state of the output in the previous interrupt processing and the state of the output in the current interrupt processing.

Also, according to the rotation direction, in the step S23 the number of pulses is counted up and in the step S25 the number of pulses is counted down, and the amount of rotation of the rotary encoder 42 is thereby detected. However, when the count value reaches an upper limit value it is not increased further and when it reaches a lower limit value it is not decreased further.

When in the step S24, the step S28 or the step S31 the state of the respective outputs C, A or B in the previous interrupt processing is not held in the RAM 51, in the step S32 the present state of the output is stored in the RAM 51 and the interrupt processing is ended (that is, when the first pulse is detected, because there is no value already held in the RAM 51, only processing for storing the state of the output in the RAM 51 is carried out).

In a step S33, the control circuit 7 stores the state of the output at the current interruption (the pulse count value) in the RAM 51 and outputs a control signal to the picture processor 3 for making the picture processor 3 carry out an adjustment of the CRT 5 in correspondence with that state of the output (the pulse count value).

Because the picture processor 3 carries out an adjustment of the CRT 5 in synchronization with a vertical synchronization signal inserted between each frame (or each field) of the picture signal, in a step S34 it determines whether or not a vertical synchronization signal has been supplied at this time and when it determines that a vertical synchronization signal has been supplied it reads out in a step S35 the pulse count value from the RAM 51 and carries out adjustment corresponding to that count value.

When in the step S33 the picture processor 3 determines that a vertical synchronization signal has not been supplied it ends the interrupt processing.

As described above, when the game button 31 is rotated, the rotary encoder 42 senses this rotation and supplies signals (outputs A, B and C) corresponding to this rotation to the control circuit 7 and the control circuit 7 detects the direction of rotation of the game button 31 from these signals and makes the picture processor 3 carry out a preset type of adjustment on the displayed picture in correspondence with the rotation direction and the amount of rotation.

For example, by rotating the game button 31 it is possible to carry out the four types of screen adjustment, such as adjustment of the vertical direction length (vertical size) of the displayed picture, adjustment of its horizontal direction length (horizontal size), adjustment of its display position in the vertical direction in the CRT 5 (vertical position) and adjustment of its display position in the horizontal direction (horizontal position).

FIGS. 8A and 8B show display examples illustrating adjustment of the vertical size of a displayed picture. When the game button 31 is rotated clockwise, a control signal corresponding to that rotation is supplied to the picture processor 3 and, as shown in FIG. 8A, the vertical size of the displayed picture increases (however, the horizontal direction size of the displayed picture is not changed). When the game button 31 is rotated counterclockwise, as shown in FIG. 8B, the vertical size of the displayed picture decreases (however, the horizontal direction size is not changed).

In this way, an adjustment of the vertical size of the displayed picture is carried out. An upper limit value and a lower limit value of the vertical size of the displayed picture are preset, and if at this time the vertical size reaches either of these values, even if the game button 31 is rotated further, size change exceeding the respective limit value is not carried out.

Figure 7:
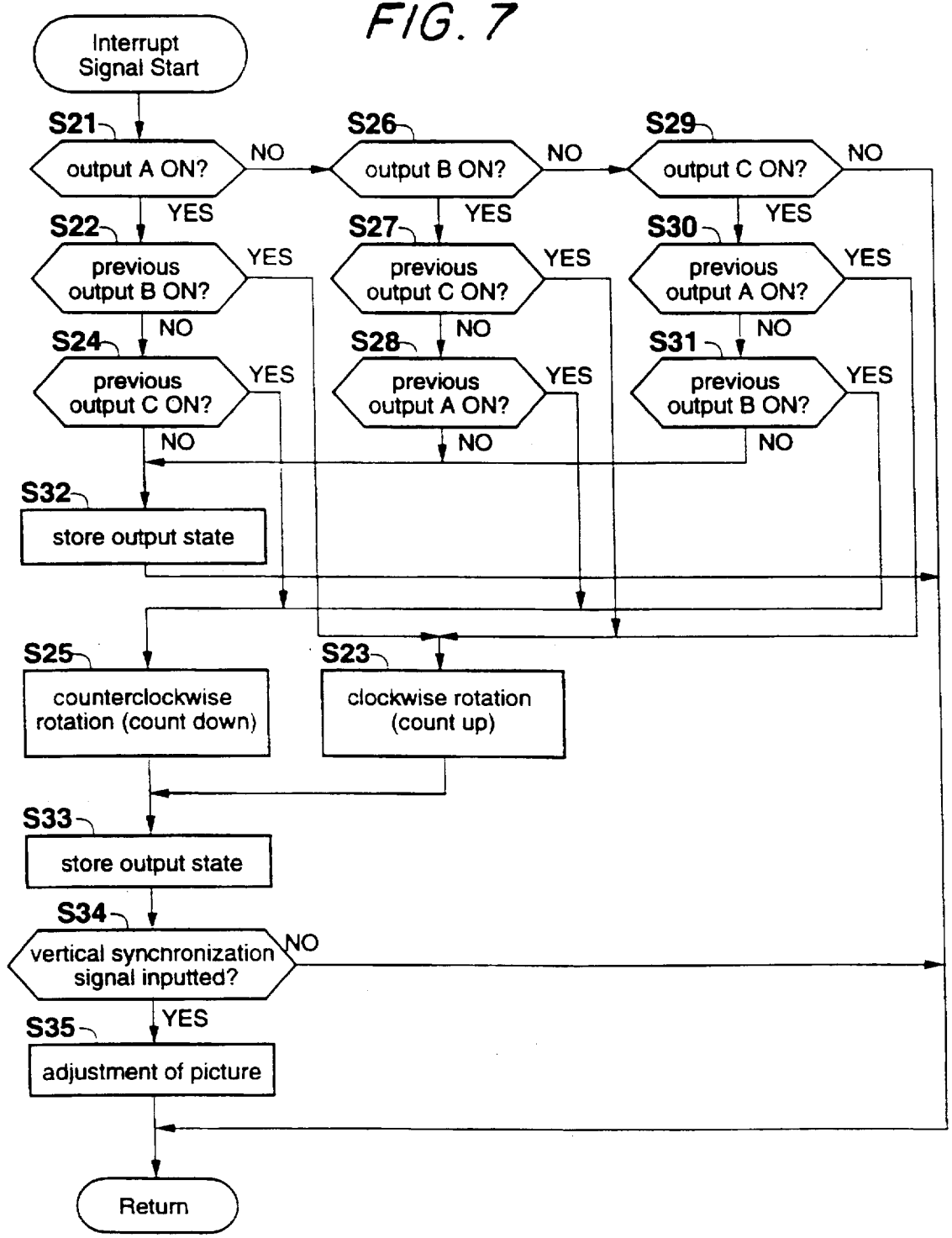
FIG. 7 is a flow chart illustrating the operation of a control circuit 7 of FIG. 1 during interrupt processing.

For example, the range between the upper limit value and the lower limit value is divided into thirty parts and when in accordance with the flow chart of FIG. 7 one rotation pulse in the clockwise direction (the CW direction) of the game button 31 is detected, if the value (the vertical size) has not reached the upper limit value then the value (the vertical size) is changed toward the upper limit value by 1/30 of the length between the upper limit value and the lower limit value, and when one rotation pulse in the counterclockwise direction (the CCW direction) is detected, if the value has not reached the lower limit value then the value similarly is changed toward the lower limit value.

FIGS. 9A and 9B show display examples illustrating adjustment of the horizontal size of a displayed picture. When the game button 31 is rotated clockwise, a control signal corresponding to that rotation is supplied to the picture processor 3 and, as shown in FIG. 9A, the horizontal size of the displayed picture increases. When the game button 31 is rotated counterclockwise, as shown in FIG. 9B, the horizontal size of the displayed picture decreases.

In this way, adjustment of the horizontal size of the displayed picture is carried out. An upper limit value and a lower limit value of the horizontal size of the displayed picture are preset, and if at this time the horizontal size reaches either of these values, even if the game button 31 is rotated further, size change exceeding the respective limit value is not carried out.

FIGS. 10A and 10B show display examples illustrating adjustment of the vertical direction display position. When the game button 31 is rotated clockwise, a control signal corresponding to that rotation is supplied to the picture processor 3 and the picture moves upward as shown in FIG. 10A. When the game button 31 is rotated counterclockwise, the picture moves downward as shown in FIG. 10B.

In this ways adjustment of the vertical direction display position is carried out. An upper limit value and a lower limit value of the vertical direction display position are presets and when the display position reaches either of these values, even if the game button 31 is rotated further, movement exceeding the respective limit value is not carried out.

FIGS. 11A and 11B show display examples illustrating adjustment of the horizontal direction display position. When the game button 31 is rotated clockwise, a control signal corresponding to that rotation is supplied to the picture processor 3 and the picture moves to the right as shown in FIG. 11A. When the game button 31 is rotated counterclockwise the picture moves to the left as shown in FIG. 11B.

In this way, adjustment of the horizontal direction display position is carried out. An upper limit value and a lower limit value of the horizontal direction display position are preset, and when the display position reaches either of these values, even if the game button 31 is rotated further, movement exceeding the respective limit value is not carried out.

As described above, by rotating the game button 31 it is possible to carry out adjustment of the vertical size, the horizontal size, the vertical position and the horizontal position of the displayed picture.

Figure 12:
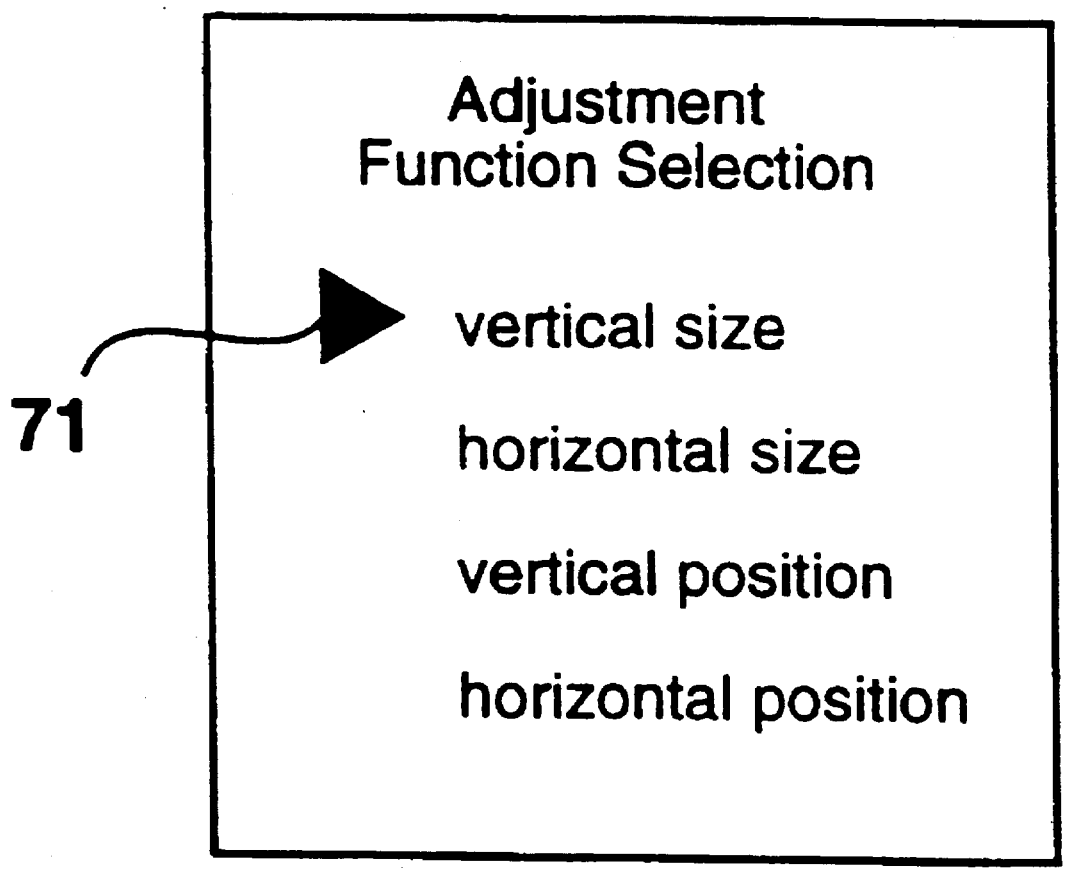
FIG. 12 is a view showing an example of a display of a menu for selecting an adjusting function of a game button.

When these kinds of adjustment (vertical size, horizontal size, vertical position and horizontal position) are not made together but are made independently, and a desired one is to be selected from among them, a construction may be adopted wherein by operating the input device 8 or the remote controller 21 a predetermined menu is displayed on the CRT 5 as shown in FIG. 12 and a cursor 71 on the CRT 5 is moved to select an item for adjustment.

Figure 13:
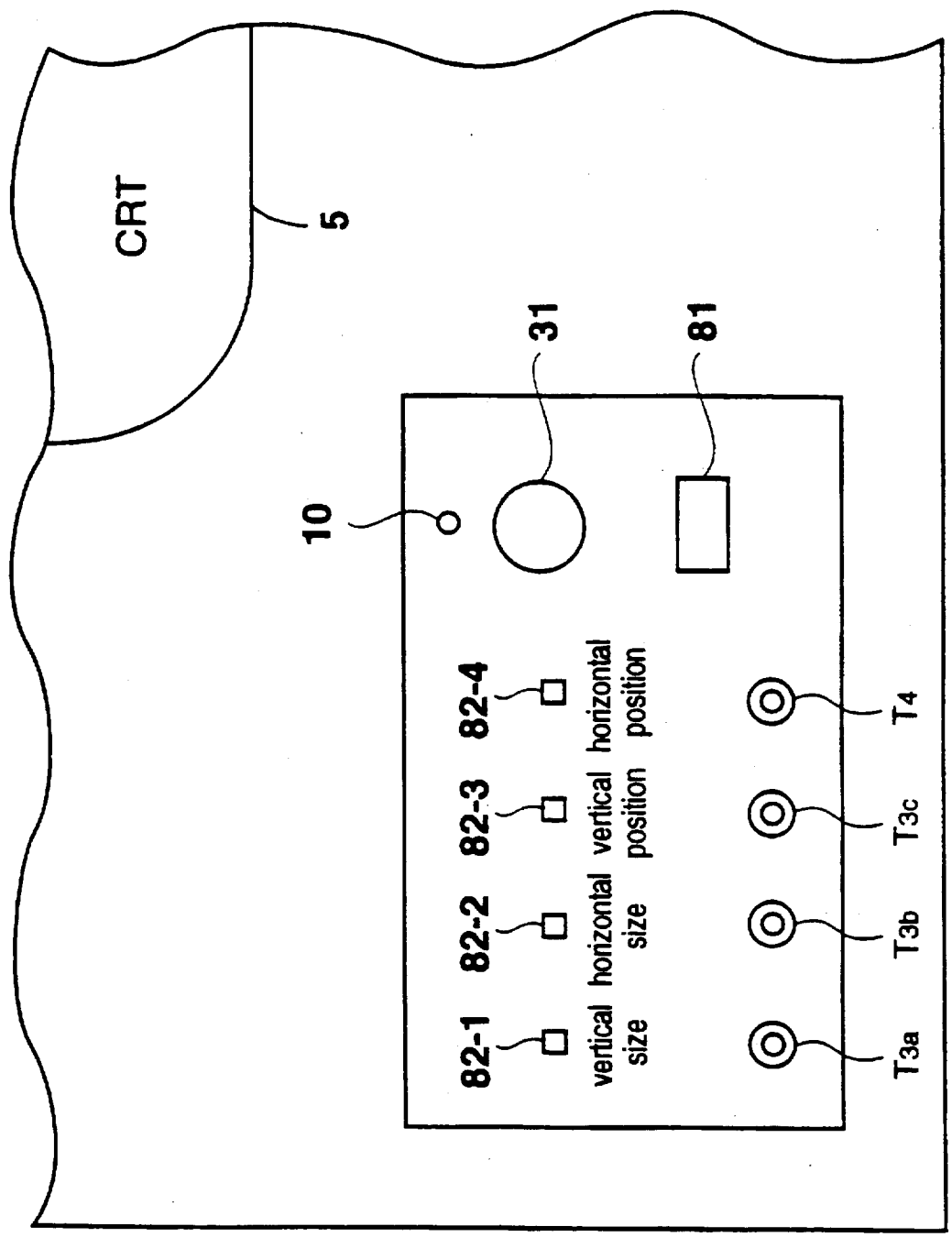
FIG. 13 is a view showing an example of a disposition of an adjustment mode changeover button for selecting an adjustment mode of a game button.

In cases where an item for adjustment is selected, for example a construction may be adopted wherein as shown in FIG. 13 an adjustment mode changeover button 81 and adjustment mode indicators 82-1 through 82-4 for indicating an adjustment mode are provided and each time the adjustment mode changeover button 81 is pressed the adjustment mode changes to 'vertical size', 'horizontal size', 'vertical position', 'horizontal position', 'vertical size', . . . , with the adjustment mode indicators 82-1 through 82-4 corresponding to the adjustment modes being lit up accordingly at the same time.

Also, as another example of a way of selecting the item for adjustment, it is possible to assign one adjustment mode to each of the rotation directions (clockwise and counterclockwise) of the game button 31.

Figure 14:
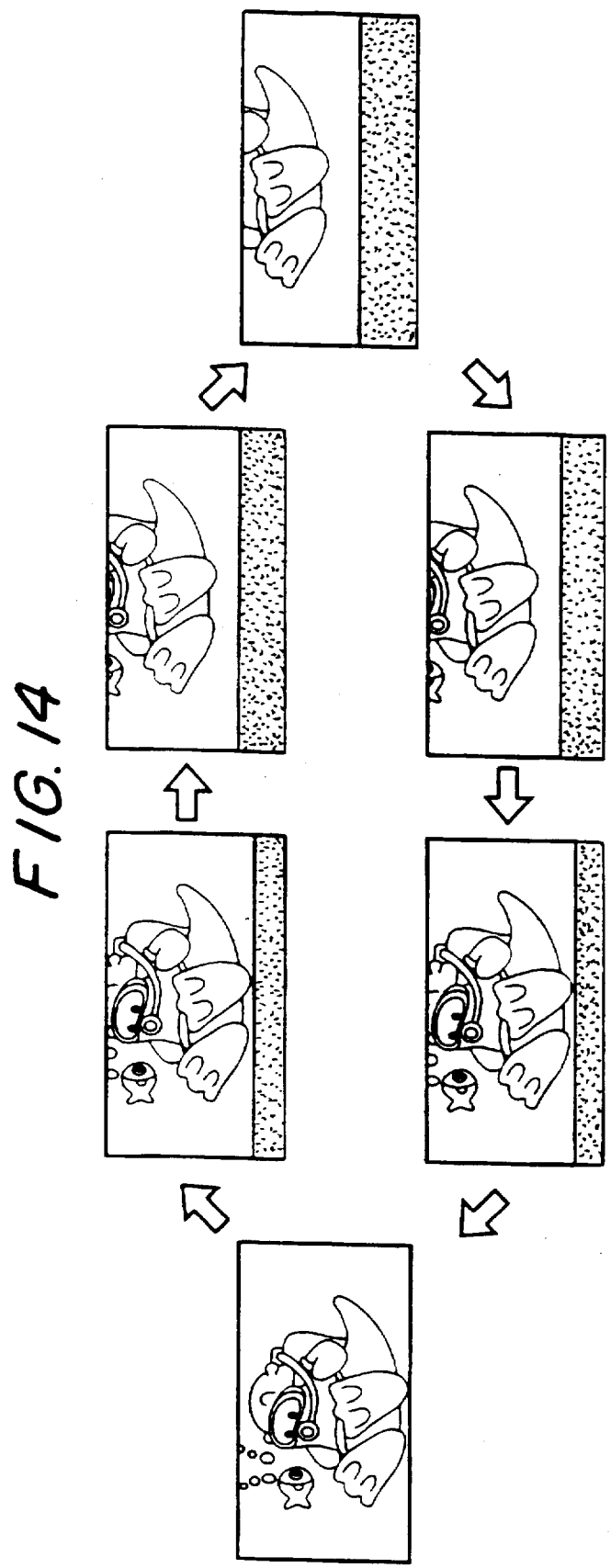
FIG. 14 is a view illustrating an example of a screen adjusting function assigned to a predetermined direction of rotation of a game button.
Figure 15:
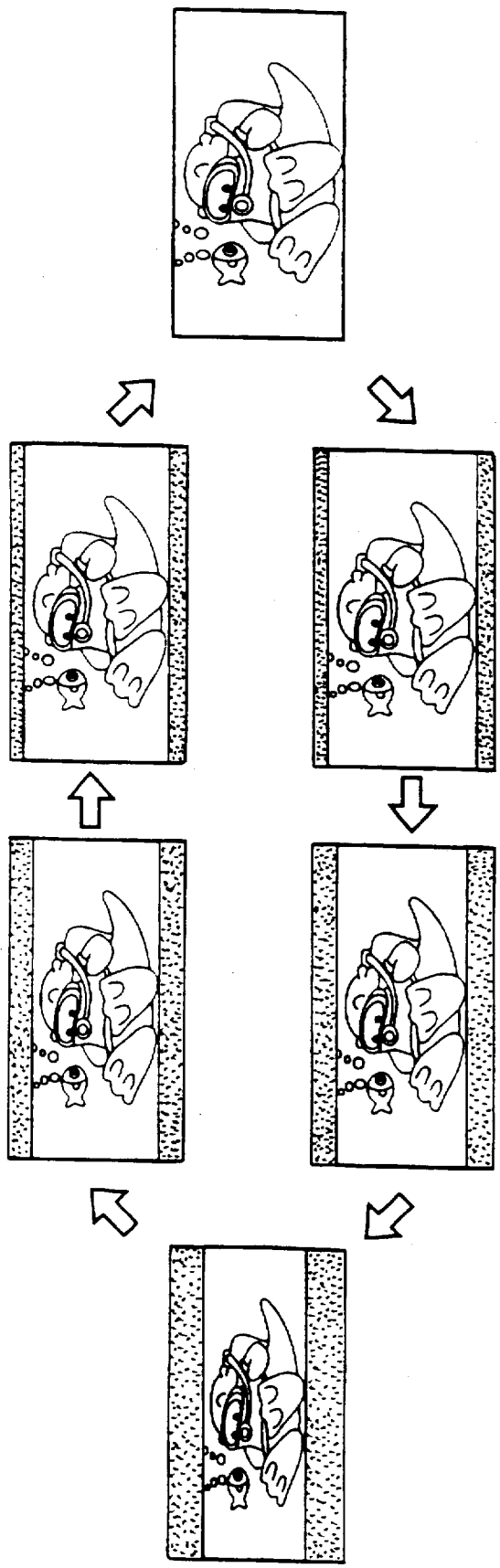
FIG. 15 is a view illustrating another example of a screen adjusting function assigned to a predetermined direction of rotation of a game button.

For example, when adjustment of the vertical position of the displayed picture is assigned to the clockwise rotation of the game button 31 and adjustment of the vertical size of the displayed picture is assigned to counterclockwise rotation of the game button 31, when the game button 31 is rotated clockwise, as shown in FIG. 14 the displayed picture performs upward movement and downward movement between predetermined upper and lower limit values, and when the game button 31 is rotated counterclockwise, as shown in FIG. 15 the displayed picture exhibits an increase and decrease in vertical size between predetermined upper and lower limit values.

Figure 16:
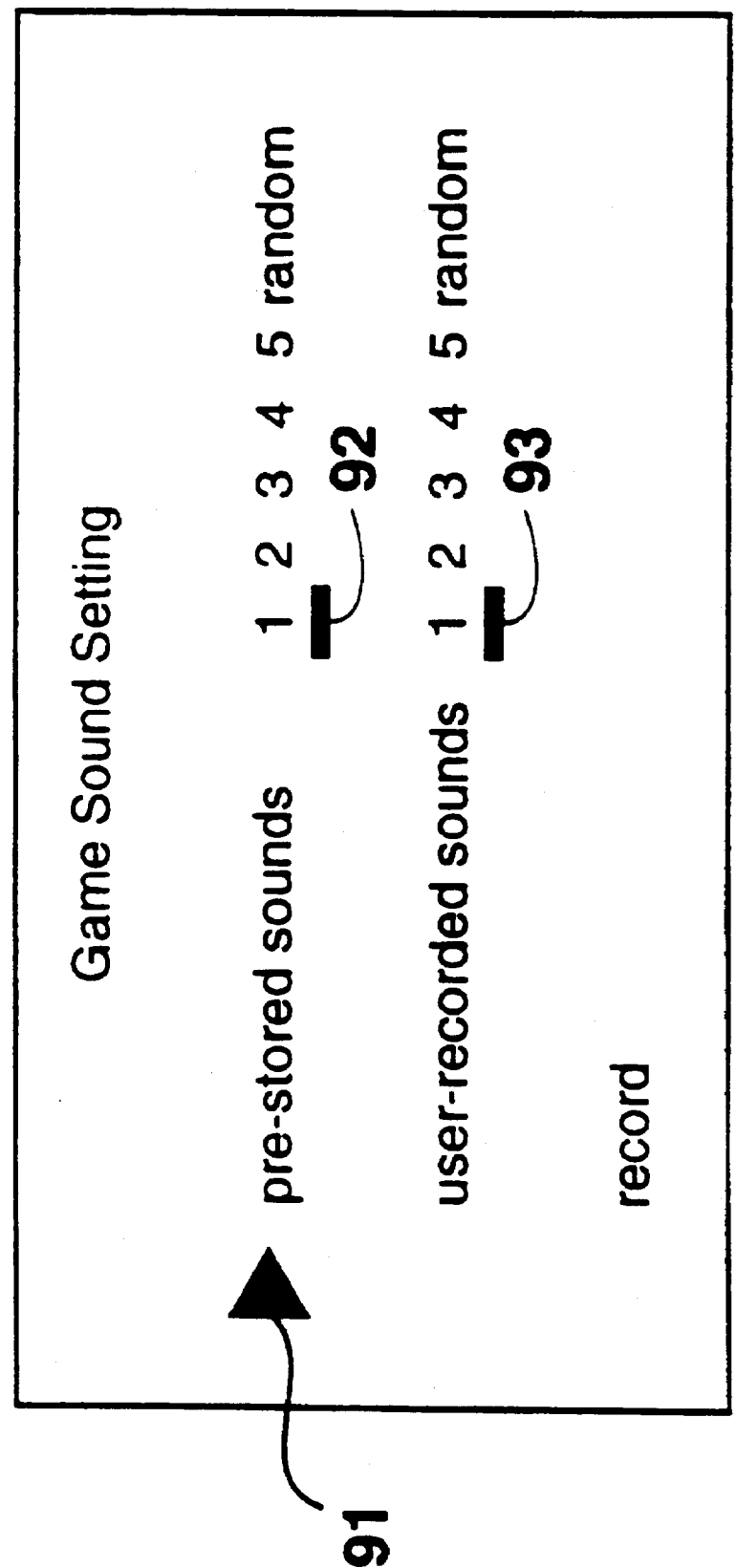
FIG. 16 is a view showing an example of a display of a menu for selecting a sound to be outputted when a game button is pressed.

The sound outputted when the game button 31 is pressed is selected from a predetermined menu displayed on the CRT 5 as shown in FIG. 16.

In this preferred embodiment, the user operates the input device 8 or the remote controller 21 to display a menu on the CRT 5 as shown in FIG. 16 and then moves a cursor 91 to select a sound pre-stored in the sound memory 13 at the time of manufacture or a user-recorded sound stored in the sound memory 13 by the user.

Then, when selecting a pre-stored sound, by operating the input device 8 or the remote controller 21 the user moves a cursor 92 to select one of five pre-stored sounds numbered 1 through 5. Also, by moving the cursor 92 to the item 'Random', the user can select one of the sounds numbered 1 through 5 at random by means of the control circuit 7.

When selecting a user-recorded sound, by operating the input device 8 or the remote controller 21 the user moves a cursor 93 to select one of five user-recorded sounds numbered 1 through 5. Also, by moving the cursor 93 to the item 'Random', the user can select one of the user-recorded sounds numbered 1 through 5 at random.

Data of the sound types and the sound numbers selected in this way is stored in the parameter memory 12, and when the game button 31 is pressed the control circuit 7 reads out this data from the parameter memory 12 and in accordance with this data reads out selected sound data from the sound memory 13 and makes the sound processor 4 output that sound.

In this preferred embodiment, five pre-stored sounds are provided and provision is made for five user-recorded sounds, but data of other numbers of sounds may be handled.

When storing user-recorded sounds, first the cursor 91 is moved to the item 'Record' and a predetermined button is pressed and then by moving the cursor 93 the number of a user-recorded sound to be stored is selected from the user-recorded sound numbers 1 through 5.

Then, when the predetermined button is pressed again the control circuit 7 makes the recording start and sound supplied from a microphone (not shown) is converted into sound data and stored in the sound memory 13 as data of the selected user-recorded sound number. When a predetermined button is pressed, the control circuit 7 ends recording.

In this way, the sound outputted when the game button 31 is pressed is set.

As described above, in this preferred embodiment, by the game button 31 being pressed, a picture and a sound of a game unit are displayed and outputted, and by the game button 31 being rotated, a predetermined type of adjustment is carried out on the picture. Therefore, for example when a plurality of pieces of game software are used, adjustment of the picture for each piece of game software is easy. Also, even in a TV having an aspect ratio of 16:9 adjustment of the picture can be carried out easily.

In this preferred embodiment, the terminals $T_3$ ($T_{3a}$, $T_{3b}$, $T_{3c}$) and $T_4$, the game button 31 and the indicator 10 are disposed as shown in FIG. 2 or FIG. 13, but the invention is not limited to these arrangements.

Also, although in this preferred embodiment there are four types of picture adjustment (vertical size, horizontal size, vertical position and horizontal position), a construction can be adopted wherein more types of adjustment can be carried out.

In the preferred embodiment described above, adjustment is carried out on a picture of a game unit, but it is also possible for a construction to be adopted wherein adjustment of other picture inputs can be carried out.

As described above, according to the signal processing device of the first aspect of the invention and the signal processing method of the second aspect of the invention, because predetermined types of adjustment are carried out on an outputted picture signal in correspondence with rotation of inputting means or an input operation part, it is possible to adjust picture settings by performing a simple operation.

Also, according to a signal processing device of the third aspect of the invention and a signal processing method of the fourth aspect of the invention, because a predetermined sound is outputted when a predetermined picture signal is selected from a plurality of inputted picture signals, the user can easily confirm that this picture signal has been selected.

What is claimed is:

1. A signal processing device for inputting a plurality of picture signals and for outputting a predetermined picture signal from said plurality of picture signals, comprising:

inputting means for selecting said predetermined picture signal from among said plurality of picture signals and upon rotation inputting an adjustment of said predetermined picture signal;

detecting means for detecting said rotation of said inputting means; and adjusting means for adjusting said predetermined picture signal in response to said rotation of said inputting means detected by said detecting means.

2. The signal processing device as set forth in claim 1, wherein one of said plurality of picture signals inputted to said signal processing device is a picture signal of a television broadcast.

3. The signal processing device as set forth in claim 1, wherein one of said plurality of picture signals inputted to said signal processing device is a picture signal of a game unit.

4. The signal processing device as set forth in claim 1, wherein said adjusting means adjusts said predetermined picture signal so that a size of a displayed picture produced from said predetermined picture signal changes in a vertical direction on a display.

5. The signal processing device as set forth in claim 1, wherein said adjusting means adjusts said predetermined picture signal so that a size of a displayed picture produced from said predetermined picture signal changes in a horizontal direction on a display.

6. The signal processing device as set forth in claim 1, wherein said adjusting means adjusts said predetermined picture signal so that a position of a displayed picture produced from said predetermined picture signal changes in a vertical direction on a display.

7. The signal processing device as set forth in claim 1, wherein said adjusting means adjusts said predetermined picture signal so that a position of a displayed picture produced from said predetermined picture signal changes in a horizontal direction on a display.

8. The signal processing device as set forth in claim 1, wherein said adjusting means includes means for performing a plurality of types of adjustment on said predetermined picture signal.

9. A signal processing method for inputting a plurality of picture signals and for outputting a predetermined picture signal from said plurality of picture signals, comprising the steps of:

detecting a selection operation of an input operation element;

selecting said predetermined picture signal from among said plurality of picture signals in response to said selection operation of said input operation element;

detecting a rotation of said input operation element; and performing a predetermined type of adjustment on said predetermined picture signal from said plurality of picture signals according to a detected rotation of said input operation element.

* * * * *